MULTI-APERTURED MEMORY ARRANGEMENT

Filed Aug. 21, 1962 2 Sheets-Sheet 1

DAVID R. BOLES
JOHN S. DAVIS
PAUL E. WELLS
INVENTORS

BY
Fraser and Bogucki
ATTORNEYS

MULTI-APERTURED MEMORY ARRANGEMENT

Filed Aug. 21, 1962 2 Sheets-Sheet 2

DAVID R. BOLES
JOHN S. DAVIS
PAUL E. WELLS
INVENTORS

BY
Fraser and Bogucki
ATTORNEYS

United States Patent Office 3,309,681
Patented Mar. 14, 1967

3,309,681

MULTI-APERTURED MEMORY ARRANGEMENT

David R. Boyles, Van Nuys, John S. Davis, Glendale, and Paul E. Wells, Los Angeles, Calif., assignors to The Bunker-Ramo Corporation, a corporation of Ohio Filed Aug. 21, 1962, Ser. No. 218,389
18 Claims. (Cl. 340—174)

This invention pertains to information storage arrangements and more specifically to magnetic memory arrangements adapted to store information in individual memory cells comprising adjacent symmetrical flux paths.

In connection with the development and use of automatically controlled machines, data processing equipment, computers and the like, the need has arisen for arrangements capable of storing information corresponding to control programs, reference material and other data. Various arrangements have been devised including storage, or memory, devices which, with their allied equipment, operate to retain the stored information until required and to transfer the information to the proper facility when needed. Arrangements of interest to the present invention are of the temporary storage type in which stored information may be read out and replaced by other stored information. It is especially desirable that such arrangements operate rapidily and reliably and that they provide a high storage density at relatively low cost.

A recent development, the wire screen memory, provides an improved information storage device having many of these desirable features. The wire screen memory comprises a screen of filamentary members (such as a conventional window screen) which is coated with suitable material for providing paths encircling the openings in the screen exhibiting a low reluctance (relative to air) to magnetic flux. Conductors are woven into the screen to thread selected portions of the screen, thus forming a plurality of individual storage elements. By applying appropriate signals to selected conductors of the storage arrangements thus provided, the magnetic material at corresponding elements may be affected to store discrete bits of information. The stored information may be detected by the same or other conductors associated with the storage elements by sensing flux changes in the magnetic material surrounding the openings. Such wire screen arrangements provided substantially improved storage media by virtue of their compactness and low cost of fabrication but they are not without problems with respect to operating tolerances. One such problem has arisen from the difficulty of obtaining truly uniform storage elements over the extent of a wire screen memory structure produced in the manner described. Uniformity is particularly desirable in wire screen memory structures because of the manner of fabrication; it is not feasible to remove and replace an individual storage cell which turns out to be substandard in quality. While a limited number of such substandard cells may be tolerated, any significant proportion of such cells requires that the entire screen matrix be discarded. In such a case, the inherent advantage of wire screen memory structures is not realized.

Other information storage arrangements involving storage cells which are formed in groups, usually to achieve compactness of storage and economy in fabrication, are also subject to the same problem. Non-uniformity between individual cells in a multi-cell structure makes it difficult or impossible to identify stored information during the readout process; yet replacement of individual cells is not feasible in such a structure. Accordingly, where the existence of one or more unacceptable memory cells requires the rejection of an entire storage matrix, the economy realized in the fabrication process is defeated and the matrix structures of the type described are thus commercially unfeasible.

Accordingly, it is a general object of this invention to provide improved matrix arrangements for information storage.

More particularly, it is an object of this invention to provide improved information storage arrangements of the wire screen memory type.

Another object of this invention is to provide more economical and reliable memory structures than have hitherto been available.

A more specific object of this invention is to reduce the tolerance requirements imposed on matrix structure storage arrangements.

A further object of the invention is to improve the uniformity of operation of individual memory cells in a memory matrix.

A specific object of the invention is to provide a cell structure for a wire screen memory device which utilizes particular modes of operation that are relatively insensitive to minor variations of magnetic properties over the extent of the wire screen device.

In brief, the present invention provides a multi-cell memory structure for information storage with each individual storage cell comprising a multi-apertured element having symmetrical magnetic flux paths which are controlled by interwoven drive conductors in a manner such that the results of non-uniformities in individual cells are automatically compensated for. The principles of the present invention are generally applicable to memory structures of the type described and may be employed to advantage in many different specific arrangements produced by various fabrication processes. The invention may best be described by reference to a particular type of memory arrangement, namely, the wire screen memory structure, which is representative of such devices which may be fabricated as an integral matrix. However, such a description is by way of illustration only and is not to be taken as a limitation of the scope of application of the invention.

Particular exemplary information storage arrangements in accordance with the invention comprise wire screens which are coated with magnetic material suitable for providing low reluctance magnetic flux paths and have conductors uniquely interwoven therein to carry operational signals (i.e., write, read, information and output signals). The conductors are woven to provide a plurality of individual storage elements (or cells) each including at least two interrelated, physically symmetrical flux paths forming two adjacent loops having a common central portion. The magnetic material comprising the coating which forms the flux paths exhibits the property of magnetic remanence and may advantageously be of a type having a substantially rectangular hysteresis characteristic. Because of the unique winding arrangements and the physical symmetry of the storage element flux paths provided in specific arrangements in accordance with the invention, the interrelation of magnetic flux states established by operational signals at the individual elements is advantageously such as to compensate for possible defects in the separate flux paths, thereby eliminating the need for high tolerance manufacturing processes and costly materials and substantially reducing the rejection rate encountered in the fabrication of wire screen memory devices.

More specifically, in a first exemplary arrangement of the invention, a write signal (a signal directing that storage is to take place) is applied to one of a number of horizontal conductors defining rows of cells in which information is to be stored. The horizontal conductors are interwoven in the screen to thread selected adjacent magnetic flux paths having a common portion (or common leg) in a manner such that each of the adjacent flux paths is influenced in the same direction (e.g., clockwise) by an applied current signal of insufficient magnitude to switch the magnetic state of the cell. An information signal (a signal having a unique quality depending on the specific information to be stored) is applied coincidently with the write signal to one of a number of vertical conductors appropriate to select a chosen cell in the row. The vertical conductors are interwoven in the screen so that each is associated with a corresponding column of cells for oppositely influencing the adjacent flux paths of each cell in a column. The information signals are of a magnitude sufficient to switch the magnetic state of a particular storage element or cell when applied to that element coincidently with a write signal of the same sense. By reason of the fact that write signals influence the two adjacent flux paths of a cell by establishing magnetic field components in like directions while information signals influence the two paths by developing magnetic field components in opposite directions, a selected cell (one at the intersection of horizontal and vertical conductors carrying signals coincidentally) has one flux path with additive field components and the other path with subtractive field components. Thus the path with additive field components is switched to correspond with the information to be stored while the other remains in its previous magnetic state. The particular magnetic flux path of a cell which is switched depends on the binary coded value of the information signal and thus determines the information storage condition of the cell.

A read signal (a signal directing selected cells to give up stored information) may be applied to one of a number of horizontal conductors, each woven to thread the cells of one row in a manner such that a signal will influence the adjacent paths of a cell in the same direction. The write conductors may be utilized for information readout since they are woven in an appropriate configuration. By sensing the voltages induced by the flux switched in the respective magnetic flux paths of a selected cell through the use of conductors which thread the adjacent flux paths of a cell in opposite directions (such as the information conductors), output signals may be realized which have a polarity depending on which flux path of the particular cell was switched from the storage state by the write and information signals. The output signal may be understood to represent the stored magnetic state.

In the above-described arrangement of the invention, the readout signal corresponds to the difference between the flux which is switched and that which is merely "disturbed" without being reversed. (The latter case is sometimes referred to as "shuttle flux.") Thus the polarity, not the magnitude, of the output signal indicates the stored information state. One particular advantage accruing from this arrangement of the invention is the elimination of undesirable noise signals, such as those ordinarily produced by an unswitched path, thereby permitting the use of low quality magnetic material.

In a second exemplary arrangement, the horizontal write conductors are woven in the screen so as to develop magnetic field components for magnetizing the adjacent paths of each cell in opposite directions in such a way that the common leg encounters magnetic field components which are additive. The vertical information conductors are so woven in each cell that the information signal to be stored is effectively applied to the common leg of the cell, there to combine either additively or subtractively with the writing field, depending on the binary coded digit being stored. When a write signal of sufficient magnitude is applied to a cell coincidently with an information signal of sufficient magnitude and a like direction (additive), both paths are switched from an initial magnetic state and establish a magnetic flux condition corresponding to a first binary digit. When the same write signal is applied with an oppositely directed information signal (subtractive), neither the individual flux paths nor the common leg are switched from the initial state. A read signal may be provided on a conductor threaded to affect the adjacent paths oppositely, such as the horizontal write conductors, and the magnetic state of the common leg (and thus of the storage cell) may be sensed by a vertical conductor, such as the information conductor. If the cell is switched during readout, an output signal is developed indicating the storage of a particular binary digit, while the other binary digit is indicated by the absence of any significant output signal.

The symmetrical aspect of the adjacent flux paths of the cells in the second arrangement allows sensing at the common leg only. This permits some variations in the magnetic properties of other portions of the cell without loss of signal fidelity, thus advantageously relaxing the rather strict requirements of uniformity in material and in physical dimensions over the extent of a screen memory device which were required in previously known structures. This improved capability results from the circumstance that the center leg may be saturated by any combination of magnetic flux from the two individual paths, no matter in which path the flux predominates.

The invention may be better understood from the following detailed description taken together with the drawings, in which like elements have like designations and in which.

Figure 1:
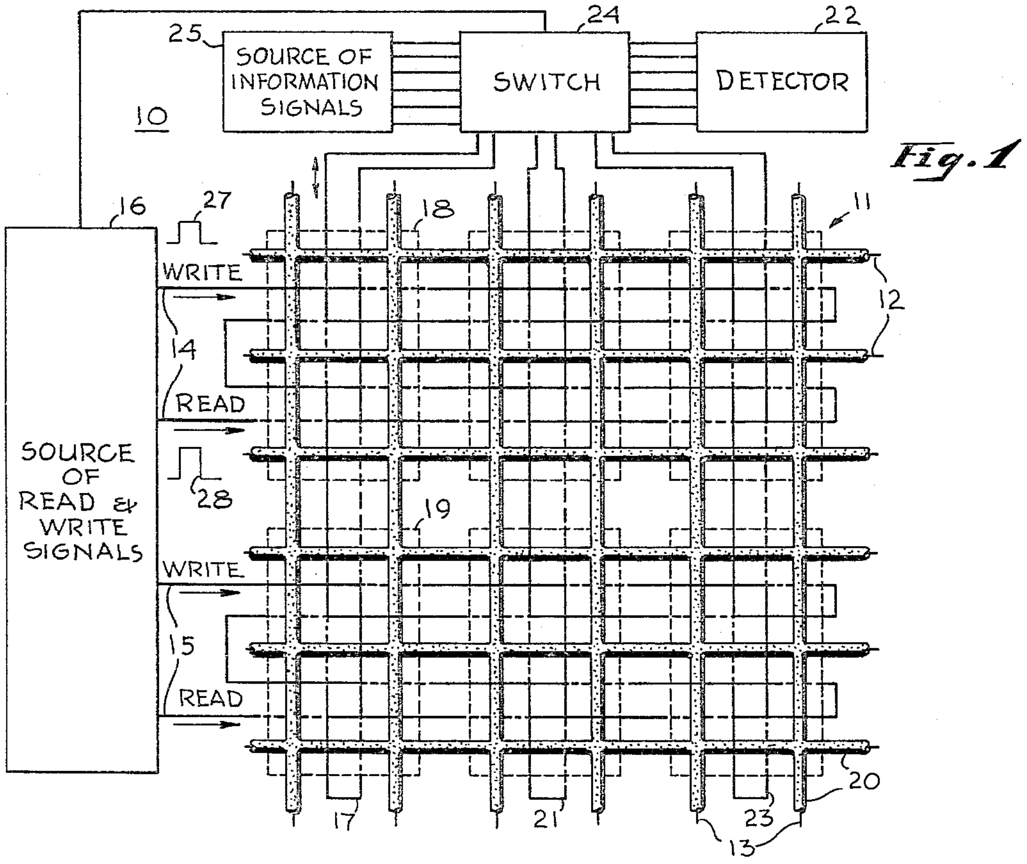
FIGURE 1 is a diagram illustrating a particular wire screen memory arrangement in accordance with the invention adapted to provide information storage in a first mode.

FIG. 1 of the drawings shows a wire screen memory arrangement 10 in accordance with the invention. The basic supporting structure for the arrangement 10 comprises a screen 11 of filamentary members such as horizontal members 12 and vertical members 13. The specific filamentary material may vary; for example, the material may be a metal, a plastic resin or the like. Some usable materials provide an improper surface for the magnetic coating, however, and should first be coated with a material capable of providing an appropriate bonding base. The screen 11 is then coated by well-known techniques, such as electroless plating method, with a magnetic material 20 for providing a low reluctance path (relative to air) for magnetic flux.

Horizontal and vertical conductors, suitably insulated, are woven into the coated screen 11 to provide conductors for transferring operational signals. These conductors may be woven as part of the screen before the magnetic material is deposited or may be threaded therein after deposition. The screen 11 has horizontal read-write conductors 14 and 15 threaded in a pattern such that a unidirectional signal develops magnetic field components in like directions in the adjacent flux paths of an individual cell (each of which has a substantially square cross-section in the plane of the screen 11). For convenience, the double-loop cells are shown enclosed within dotted lines in FIG. 1 and are given reference characters; for example, cells 18 and 19 have been so designated. Signals are applied to the horizontal conductors 14 and 15 from a source 16 of read and write signals. The source 16 may be of any well-known type which will selectively furnish signals of appropriate polarity to one of a plurality of conductors. Write signals of a first sense are applied for writing or storing information while read signals of a second sense are applied for reading out stored information.

Vertical information conductors 17, 21 and 23 are woven or threaded into the screen 11 in a pattern such that signals applied to those conductors develop oppositely directed magnetic field components in adjacent paths of a given cell. A source of information signals 25, which may be of any well-known type for furnishing signals of appropriate polarity to a selected one of a plurality of conductors, and a detector 22 are arranged to be selectively connected by a switch 24 to the information conductors 17, 21 and 23. The switch 24 may be controlled from the source 16 to operate in response to the type of signal (i.e., read or write) applied to the energized one of the conductors 14 and 15 for connecting either the source 25 or the detector 22 to the information conductors. Alternatively, individual read, write, information and sensing windings may be provided, but the arrangement shown will accomplish the appropriate storage and is believed to illustrate the inventive aspects of the illustrated structure.

It should be noted that each of conductors 14, 15, 17, 21 and 23 threads each flux path twice in order to allow the more efficient utilization of the operational signals. If desired, additional turns of a winding may be arranged in order to enhance the degree of coupling between the conductors and the magnetic flux paths.

When it is desired to store information in the arrangement of FIG. 1, a write signal such as the pulse 27 having a sense as shown and a magnitude of ⅔I (I being the magnitude of current required to switch the magnetic flux state of one path of a cell) is applied from the source 16 to a selected one of the horizontal conductors 14, 15 threading the selected row of cells. Coincidently therewith, an information signal having a magnitude of ⅓I is applied from the source 25 via the switch 24 to the one of the vertical conductors 17, 21, 23 threading the selected cell. Because of the way in which the read-write conductors 14 and 15 are woven in the memory structure 11, the write signal pulse 27 on the conductor 14 develops magnetic field components in the same direction in both loop paths of the cells in a given row with which it is associated. On the other hand, the information conductors such as 17 are woven in a pattern to develop magnetic field components in the respective loop paths of an individual cell in opposing directions. The directions of the magnetic field components developed by information signals on the information conductors are reversed, depending upon the particular binary digit being stored. As a result, regardless of which binary digit is being stored, the respective magnetic flux components developed by the information signal and the write signal combine additively in one path of a selected cell and subtractively in the other path of the selected cell. Consequently only one of the magnetic flux paths of the selected cell is switched from an initial magnetic state to the opposite magnetic state. Which of the particular magnetic paths is switched depends upon the particular binary digit being stored. If a first path is switched a first binary digit is stored, while if the other path is switched a second binary digit is stored.

When it is desired to read out the stored information, a read signal 28 of a sense as shown (opposite that of a write signal 27) is applied to the appropriate one of the conductors 14, 15. The read signal 28 restores the initial magnetic state of the path of a cell which had previously been switched. The remaining path of the cell experiences a minor fluctuation because of the previously mentioned shuttling effect. The flux changes in both paths of the selected cell are detected by the associated vertical conductor which is connected to the detector 22 by the switch 24 during the application of a read signal. Because flux changes in the adjacent paths affect the vertical conductor oppositely, the ultimate polarity of the output signal from the selected cell is determined by the path which is switched. This signal is detected by the detector 22 via the conductors 17, 21 and 23. Depending on the details of the switch 24 for connecting one or all of the conductors 17, 21 and 23 to the detector 22 and of the detector 22 for detecting one or a plurality of coincident signals, the information stored by a single cell or that stored in an entire row may be read out.

As a specific example, a condition defined as a binary "0" state may be stored in the following manner in the cell 18. A write signal of a suitable magnitude is applied to the conductor 14 coincidently with an information signal of a suitable magnitude directed downwardly in the left-hand portion of the conducor 17. These signals develop magnetic field components which are additive in the upper path of cell 18 (located at the intersections of the conductors 14 and 17) and are subtractive in the lower path. Assuming both paths are in the initial magnetic state (saturated in a counterclockwise sense), the upper path will have its magnetic state switched while the lower path will be insufficiently affected to switch and thus will remain in the initial state. This storage condition corresponding to a binary "0" and the effect of the coincident signals are illustrated in FIG. 2.

Figure 2:
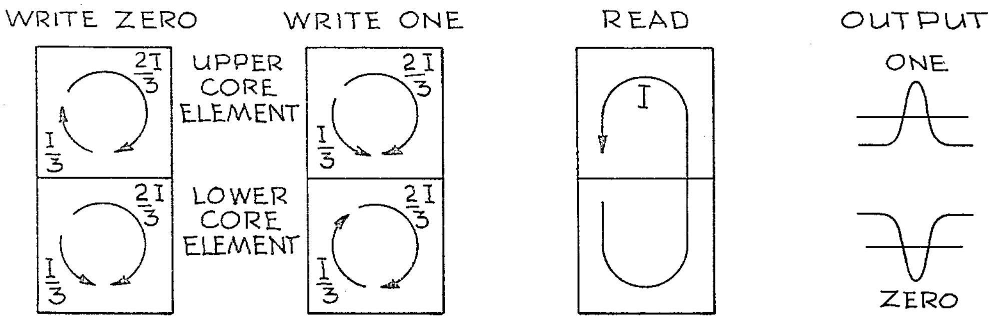
FIG. 2 is a diagram illustrating magnetic flux patterns in the paths of one memory cell of the arrangement of FIG. 1.

FIG. 2 demonstrates the effect of the various write and information signals on the adjacent paths of a cell. For example, assuming "I" to be the total current necessary to produce a sufficient field to switch one of the paths, the two magnetic states may be stored by a combination of write signals contributing two-thirds of the required field and information signals contributing one-third of the required field. When the respective field components are additive in the upper path and subtractive in the lower path, a binary "0" magnetic state is stored. If the information signals are of the other sense, a binary "1" magnetic state is stored. It should be understood that the signal values given are exemplary only and have been chosen in accordance with the usual goal of reducing the information signal requirements.

In FIG. 2 the sense of the read signal is also illustrated. The read signal is applied to the selected horizontal conductor 14 in a sense opposite that of the write signal and is of full I magnitude. When the read signal is applied to the conductor 14 of FIG. 1, the conductor 17 is connected to the detector 22 by switch 24. If the read signal switches the lower path of the cell 18 and output signal of a first sense will be produced and a binary "1" storage state detected, while if the read signal switches the upper path a second sense signal will be produced indicating a zero storage state. The aggregate output signal generated by the read signal corresponds to the difference between the flux changes in the respective paths and will thus be in a first sense for a "zero" condition and in a second sense for a "one" condition, as illustrated in FIG. 2.

Since the two paths of each cell are symmetrical and the output signals are recognized in opposite senses in adjacent core elements, the effect of noise signals from nonswitched paths is nullified in the output by the dominant signals caused by the switched flux sensed by the same output conductor. Thus, low quality magnetic material having a hysteresis characteristic displaying a substantial slope in the saturated region and which would thus be unacceptable in previously known magnetic storage arrangements may be utilized without disadvantage. Moreover, the magnitudes of both write and read signals may vary over a broad range (as long as the write signal is maintained below the switching level) without significant variation in amplitude of the output signals.

Figure 3:
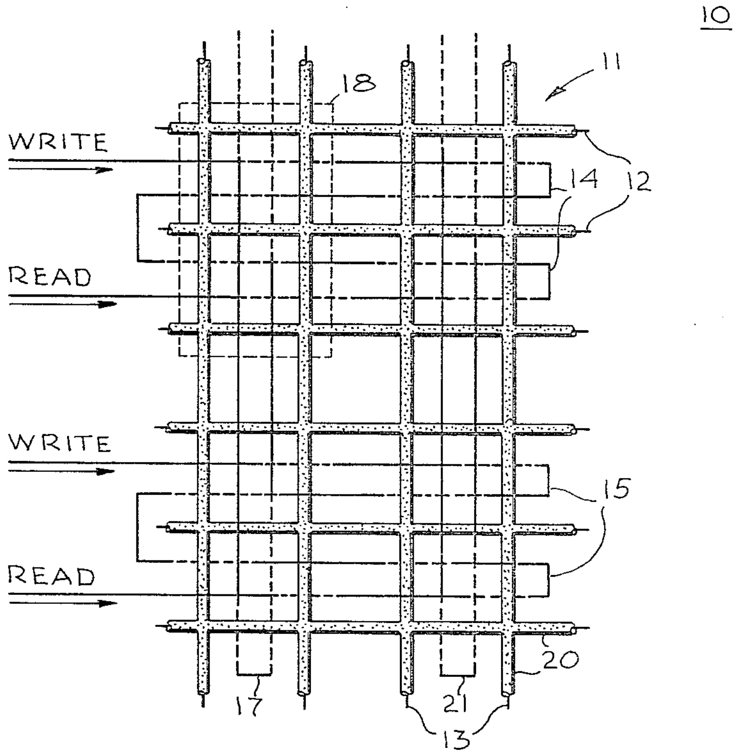
FIG. 3 illustrates another particular arrangement in accordance wth the invention adapted to provide information storage in a second mode.

In FIG. 3 there is shown another exemplary memory arrangement 10 in accordance with the invention. The arrangement 10 comprises a structural screen 11 of horizontal and vertical filamentary members 12 and 13 with a magnetic material 20 coated thereon as described above. Horizontal read-write conductors 14 and 15 are interwoven or threaded in the screen 11 in a manner such that a unidirectional signal in either conductor will tend to influence the adjacent paths of a cell in opposite directions. It should be noted that the resultant field components from both paths are in the same direction in the common leg of the cell. Information-sensing conductors 17 and 21 are woven or threaded to affect adjacent paths of a cell in opposite senses via a coupling with only the common leg of the adjacent paths.

If write and information signals identical to those provided in the arrangement of FIG. 1 are applied to selected conductors of the arrangement of FIG. 3, the signals will either additively or subtractively affect both paths of each cell alike, depending on the sense of the information signals. If the effect is additive, both paths are switched from the initial state and a binary "1" is stored. If the effect is subtractive, both paths remain in the initial state and a binary "0" is stored. This may be clearly understood by reference to FIG. 4 which illustrates the effect of the signals on the respective flux paths of a selected cell in the arrangement of FIG. 3.

It should be clearly noted that the information and write signals are both such as to generate flux in opposite senses in the adjacent paths and in the same sense in the common leg. Thus, the saturation value of the common leg acts to limit the maximum flux through the adjacent paths so that only one-half of the cross-section of each of the adjacent paths is saturated.

This limiting effect of the common leg is particularly advantageous. Since the cells of the arrangement of FIG. 3 are symmetrical in nature, variations between individual adjacent paths resulting from the fabrication process tend to balance out in the common leg. For example, it is only necessary that the sum of the flux in both paths be sufficient to switch the common leg in order to indicate a stored binary "1." Thus, a greater portion of flux may be contributed by one path than the other, and the coercive forces of the individual paths may vary substantially without adversely affecting the storage capability of the cell or the output signal therefrom.

Figure 4:
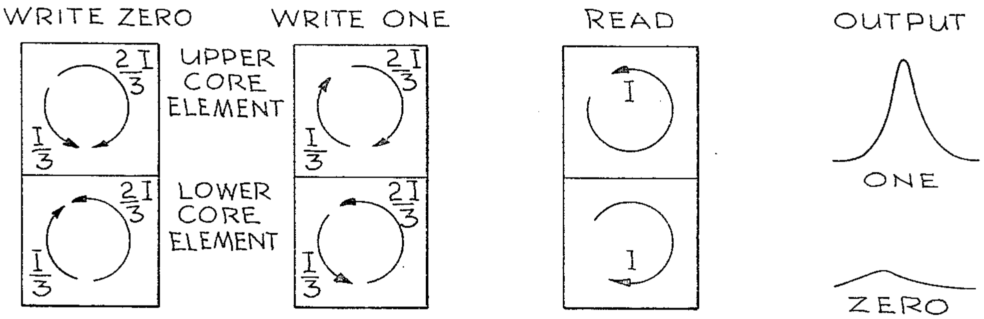
FIG. 4 is a diagram illustrating magnetic flux patterns in the paths of one memory cell of the arrangement of FIG. 3.

An exemplary operation in the arrangement of FIG. 3 may take place in the following manner. If the cell 18 receives coincident write and information signals applied via the conductors 14 and 17 so as to combine additively, both paths are switched to the binary "1" magnetic state. A read signal applied to the conductor 14 then switches both paths back to the initial state, producing a substantial output signal on the conductor 17 which senses only the summation of flux changes in the common leg. If, on the other hand, the write and information signals applied to the cell 18 are subtractive, the adjacent paths remain unswitched as indicated in FIG. 4. A read signal then has no effect on the flux state of the adjacent paths, and a substantially insignificant output signal, signifying a binary "0" is produced.

It should be specifically pointed out that the arrangement of FIG. 3 may be provided with sensing windings arranged so that a single cell or an entire row of cells may be read out at one time by the use of well-known techniques, as explained with regard to the arrangement of FIG. 1. By virtue of the arrangements of the invention shown and described above, an improved wire screen memory device is provided which presents an enhanced operation for the storage of binary coded information with reduced limitations on the tolerances permitted in the fabrication and utilization of the device.

Although there have been disclosed above particular wire screen memory arrangements by way of example of the manner in which the various aspects of the invention may be used to advantage, it will be appreciated that the invention is not limited thereto. Accordingly, any and all modifications, alterations and equivalent arrangements falling within the scope of the annexed claims should be considered to be a part of the invention.

What is claimed is:

1. An information storage arrangement comprising a screen of filamentary elements coated with remanent magnetic material in a manner to provide an ordered arrangement of symmetrical magnetic paths surrounding adjacent openings in the screen, means for coincidently applying information storage signals to produce particular flux conditions in the magnetic material surrounding two adjacent openings having a common leg, and means for selectively sensing the state of stored information.

2. An information storage arrangement comprising a screen of filamentary members coated with remanent magnetic material and disposed to form a plurality of discrete memory cells, each having an ordered arrangement of symmetrical magnetic loops surrounding adjacent openings in the screen, means for selectively applying information storage signals to produce particular flux conditions in the magnetic material of a selected cell, and means for selectively sensing the state of stored information.

3. A memory array comprising a screen of filamentary elements coated with remanent magnetic material in a manner to provide an ordered arrangement of symmetrical magnetic paths surrounding adjacent openings in the screen, means for coincidently applying write and information signals to produce first and second distinct flux conditions in the magnetic material surrounding two adjacent openings having a common leg, and means for selectively sensing the flux conditions of the magnetic material surrounding two adjacent openings having a common leg.

4. A wire screen memory arrangement comprising a plurality of filamentary members coated with magnetic material, said members being arranged to provide with the magnetic material an ordered array of storage cells having first and second symmetrical magnetic flux paths with a common leg, means for selectively applying signals in a manner tending to generate flux in the same sense in adjacent paths of said cells, means for selectively applying signals in a manner tending to generate flux of opposite sense in adjacent paths of said cells, means for selectively applying signals of a sense tending to switch flux in one path of said cells, and means for detecting the switching of said flux in order to indicate the storage state of a selected cell.

5. A magnetic memory array comprising a filamentary screen, a magnetic material coated on the screen in a manner to provide at least two adjacent symmetrical magnetic flux paths having a common leg, a write-read conductor threading each of two adjacent paths of the screen in a manner such that current in the conductor develops magnetic field components of equal magnitude in the adjacent magnetic flux paths, an information conductor threading each of the two adjacent paths of the screen in a manner such that current in the information conductor develops magnetic field components of equal magnitude but opposite direction in the two adjacent magnetic flux paths, means for applying bidirectional signals to the read-write conductor, means for furnishing binary coded signals to the information conductor, and means for sensing the flux condition of the two adjacent magnetic flux paths.

6. A magnetic memory array as in claim 5 wherein the read-write conductor is threaded in a manner to develop magnetic field components in the same direction in the two adjacent magnetic flux paths, and wherein the information conductor is threaded in a manner to produce magnetic field components aiding the magnetic field components of the read-write conductor in only one of the two adjacent magnetic flux paths.

7. A wire screen memory arrangement comprising a filamentary screen and magnetic material coated thereon to define a plurality of individual cells each having first and second symmetrical flux paths sharing a common leg, a first conductor for each of the cells arranged to conduct current for generating equal magnetic field components in both of the flux paths of a cell, a second conductor for each of the cells arranged to conduct current for generating equal magnetic field components in both of the flux paths of a cell, means for selectively applying coincident signals to the first and second conductors of each of the cells to establish a predetermined flux condition in a selected cell, and means for selectively sensing the flux condition of individual ones of the cells.

8. A wire screen memory arrangement as in claim 7 wherein the first conductor is arranged to conduct current for generating magnetic field components in the same direction in both paths of each cell, wherein the second conductor is arranged to conduct current for generating magnetic field components in opposite directions in both paths of each cell, and wherein the means for sensing the flux condition of individual ones of the cells is arranged to provide a signal proportional to the difference of the respective flux changes in the two paths of a selected cell.

9. A memory device comprising a woven screen matrix, a layer of remanent magnetic material coated on the matrix to form a plurality of storage cells each comprising two adjacent loop paths of substantially equal length and having a common central portion, means for providing electrical signals to place a first loop path of a selected cell in a first magnetic state and the other path of the selected cell in a second magnetic state, and means for switching the magnetic states of the respective paths of a selected cell to produce an output signal in accordance with the difference between the flux switched in the respective paths.

10. An information storage arrangement comprising a woven matrix structure arranged to provide at least two physically symmetrical magnetic flux paths having a common leg, means for simultaneously placing both paths in a selected magnetic state, means for switching the magnetic state of at least one of said paths, and means for sensing flux changes in the paths and for subtractively combining electrical signals induced by flux changes in the two paths.

11. A woven screen memory device comprising a woven filament matrix, a layer of magnetic material having a substantially rectangular hysteresis loop coated on the matrix to form a plurality of cells each comprising two adjacent loop paths of magnetic material having a common central portion, at least a portion of the matrix being arranged to provide a buffer region between adjacent cells, means for providing signals to produce a predetermined magnetic state in the common leg of a selected cell, and means for sensing the magnetic state of the common leg of a selected cell.

12. A woven screen memory device comprising a filamentary screen defining a plurality of individual cells arranged on a common base structure, each of said cells including magnetic material having a substantially rectangular hysteresis loop and arranged to provide two adjacent flux paths having a common central portion and disposed substantially symmetrically about the common central portion, and associated drive conductors coupling each of said cells in a manner to generate equal magnetic field components in both flux paths of a selected cell in order to control the storage of information therein.

13. A woven screen magnetic memory array including a filamentary screen defining a plurality of individual storage cells, each of the cells comprising a magnetic material exhibiting hysteretic properties, each of the cells including at least two adjacent loops of magnetic material in a substantially symmetrical configuration and having a common central portion, and a plurality of conductors coupled to each of the cells in order to provide for the storage and readout of information therein on a selective basis.

14. A woven screen magnetic memory array including a filamentary screen defining a plurality of individual storage cells, each of the cells comprising a magnetic material exhibiting hysteretic properties, each of the cells including at least two adjacent loops of magnetic material in a substantially symmetrical configuration and having a common central portion, the central portion having substantially the same cross-sectional dimensions as the associated loops, and a plurality of conductors coupled to each of the cells in order to provide for the storage and readout of information therein on a selective basis.

15. A woven screen magnetic memory array including a filamentary screen defining a plurality of individual storage cells, each of the cells comprising a magnetic material exhibiting hysteretic properties, each of the cells including at least two adjacent loops of magnetic material in a substantially symmetrical configuration and having a common central portion, and a plurality of conductors coupled to each of the cells in order to provide for the storage and readout of information therein on a selective basis and arranged to develop additive field components in one loop and subtractive field components in the other loop of a selected cell in order to store binary coded information.

16. A woven screen magnetic memory array including a filamentary screen defining a plurality of individual storage cells, each of the cells comprising a magnetic material exhibiting hysteretic properties, each of the cells including at least two adjacent loops of magnetic material in a substantially symmetrical configuration and having a common central portion, and a plurality of conductors coupled to each of the cells in order to provide for the storage and readout of information therein on a selective basis and arranged to develop additive field components in the common central portion of a selected cell in accordance with the binary coded information to be stored.

17. A magnetic memory array comprising a filamentary screen, a magnetic material coated on the screen in a manner to provide at least two adjacent symmetrical magnetic flux paths having a common leg, a read-write conductor threading each of two adjacent paths of the screen in a manner such that current in the conductor develops magnetic field components of equal magnitude but opposite direction in the two adjacent magnetic flux paths, an information conductor threading each of the two adjacent paths of the screen in a manner such that current in the information conductor develops magnetic field components of equal magnitude but opposite direction relative to each other in the two adjacent magnetic flux paths, which information conductor magnetic field components selectively aid or oppose the magnetic field components with the read-write conductor in both of the two adjacent magnetic flux paths, means for applying bi-directional signals to the read-write conductor, means for furnishing binary coded signals to the information conductor, and means for sensing the flux condition of the two adjacent magnetic flux paths.

18. A wire screen arrangement comprising a plurality of individual cells each having first and second symmetrical flux paths sharing a common leg, a first conductor for each of the cells arranged to conduct current for generating equal magnetic field components in both of the flux paths of a cell, a second conductor for each of the cells arranged to conduct current for generating equal magnetic field components in both of the flux paths of a cell, said first and second conductors each being arranged to conduct currents for generating magnetic field components in opposite directions in both paths of each cell, means for selectively applying coincident signals to the first and second conductors of each of the cells to establish a predetermined flux condition in a selected cell, and means for selectively sensing the flux condition of individual ones of the cells by sensing flux changes in the leg common to both paths of a selected cell.

References Cited by the Examiner

UNITED STATES PATENTS

| | | | |
|---|---|---|---|
| 3,083,353 | 3/1963 | Bobeck | 340—174 |
| 3,099,874 | 8/1963 | Schweizerhof | 340—174 |
| 3,105,962 | 10/1963 | Bobeck | 340—174 |
| 3,171,103 | 2/1965 | Rumble | 340—174 |
| 3,221,312 | 11/1965 | MacLacklan | 340—174 |
| 3,229,265 | 1/1966 | Brownlow | 340—174 |

BERNARD KONICK, *Primary Examiner.*

M. S. GITTES, *Assistant Examiner.*